Sept. 20, 1955  A. H. SHARPE  2,718,354
CARRIAGE CONTROLLED TOTAL TAKING MEANS
Filed Sept. 1, 1951  2 Sheets-Sheet 2
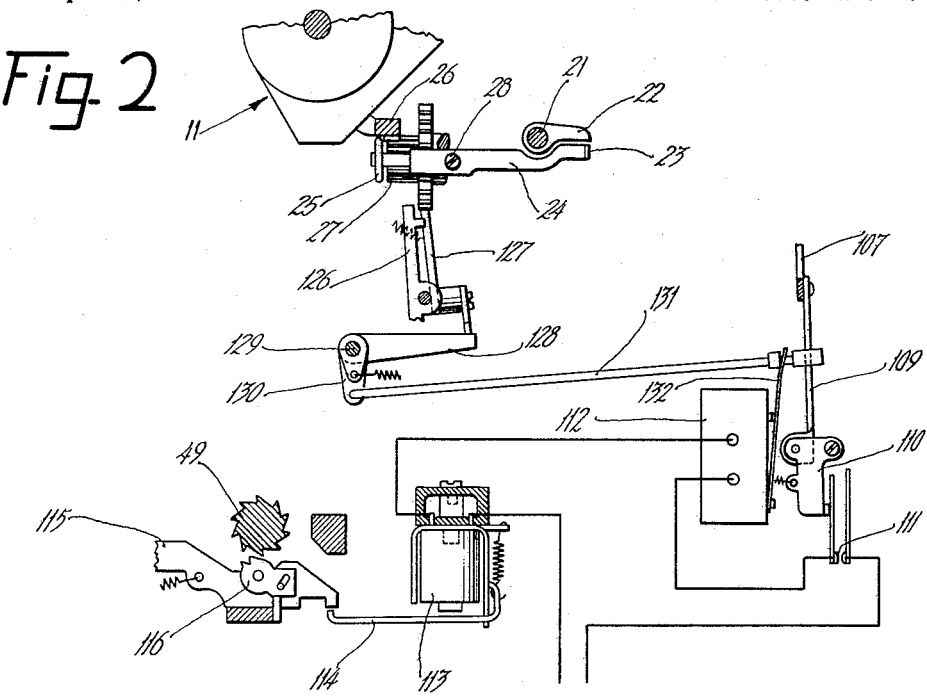
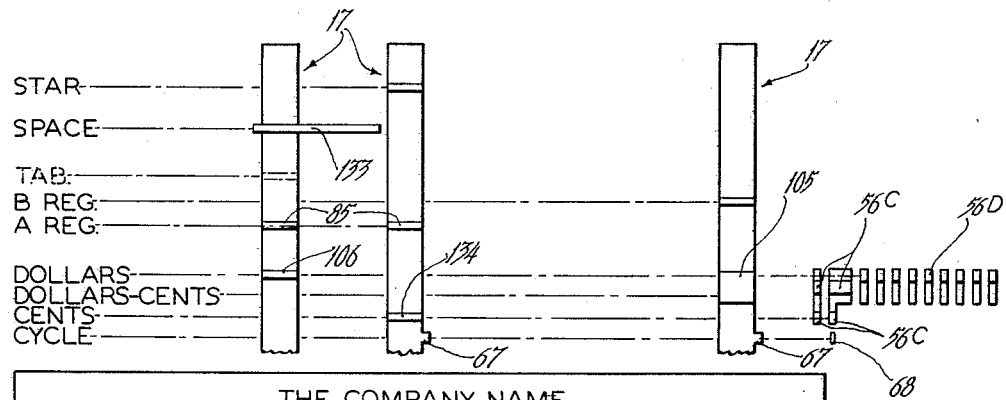
INVENTOR.
ARTHUR H. SHARPE
BY
Jesse A. Holton
ATTORNEY

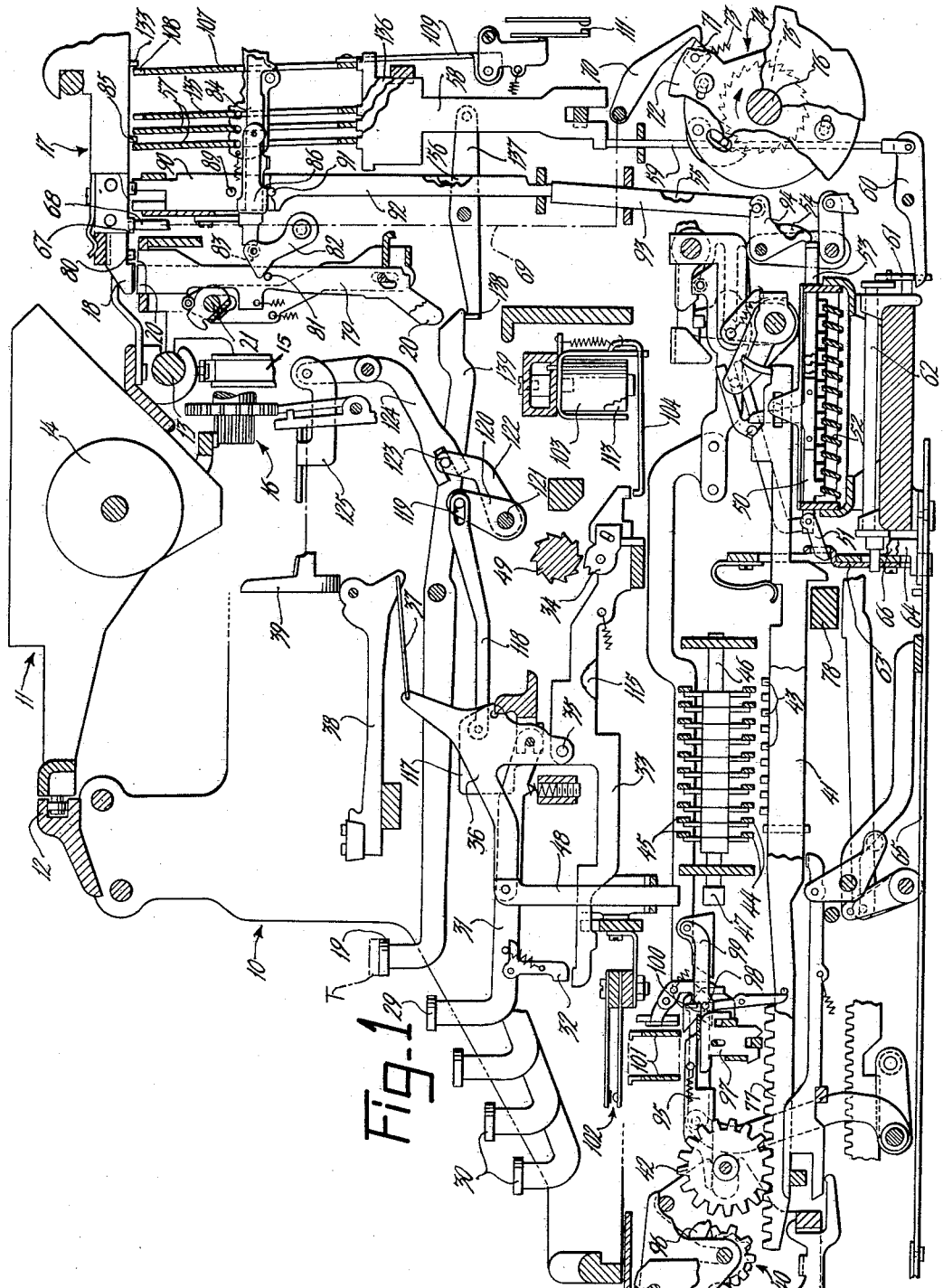

United States Patent Office 2,718,354
Patented Sept. 20, 1955

2,718,354
CARRIAGE CONTROLLED TOTAL TAKING MEANS

Arthur H. Sharpe, West Hartford, Conn., assignor to Underwood Corporation, New York, N. Y., a corporation of Delaware Application September 1, 1951, Serial No. 244,783

1 Claim. (Cl. 235—60.47)

The present invention relates to bookkeeping machines of the combined typewriting and computing class and particularly to such a machine having provision whereby a total standing in any one of a plurality of totalizers may be automatically printed upon a platen-carried work sheet. The particular machine which has been selected to illustrate the present invention is described in detail in patents to Pitman, Nos. 2,192,365, 2,372,681 and 2,398,395.

It is the particular object of the present invention to provide a machine of the class referred to which is adapted to automatically type an amount on a check on which the words Dollars and Cents or other monetary designations have been previously printed. Since it is desirable that the amount be typed on the same horizontal line on which the words are printed, the accomplishment of this object necessitates the provision of means for causing the typewriter carriage to skip over the word Dollars after the dollars portion of the amount has been typed and before the cents portion of the amount is typed.

It is a further object of this invention to provide a machine which will automatically print a portion of an amount and then skip any desired number of letter spaces before printing the remainder of the amount, and to provide such a machine with means whereby it may be readily converted from this type of operation to a standard amount printing operation by the simple expedient of changing certain carriage carried control dogs.

These and further objects, features and advantages will become more readily apparent as the description of a preferred embodiment of the invention proceeds.

Referring now to the drawings:

Figure 1 is a side elevational view, partially in section, of a bookkeeping machine embodying the present invention, Figure 2 is a diagrammatic view showing a portion of the means for causing an automatic spacing operation of the carriage, and Figure 3 is a representation of a check upon which an amount has been typed by the present machine and showing diagrammatically certain of the automatic controls.

The typewriting section of the machine is indicated generally in Figure 1 at 10 and it is provided with the usual letter feed carriage 11 mounted on front and rear rails 12 and 13 respectively and carrying the usual rotatable platen 14. The carriage is constantly urged in letter feed direction by a spring drum partially shown at 15 and is normally constrained to move with a step-by-step motion by a suitable escapement mechanism generally indicated at 16.

Carried by the carriage 11 are a plurality of control devices or column units generally designated at 17. It will be understood that there is a column unit for each vertical column on the work sheet and that these units cause the machine to add in some columns and subtract in others and also determine the particular registers or totalizers which are to be activated in the different columns. Since the present invention contemplates the making out of checks, for example pay roll checks, there will be a column on the check stub for entering the gross pay, a column for deduction of withholding tax, a column for deduction of old age insurance, a column for deduction of group insurance, other deduction columns ad nauseam, and finally the net pay will be automatically printed on the check. In most of the columns, more than one register will be activated, so that for example, when the deduction for withholding tax is made, this amount will be subtracted from the register into which the gross pay was entered and will also be entered into a separate register, so that a total of all withholding taxes may be accumulated.

Each column unit 17 is provided with a portion 18 which serves as a tabulator stop. The typewriter is provided with a row of decimal tabulator keys 19 which are associated with a group of decimal tabulator counterstops 20 in such manner that when one of the tabulator keys is depressed, the corresponding counterstop 20 will be elevated into the path of the tabulator stops 18. Any suitable arrangement for causing the tabulator keys to operate the counterstops may be employed, but the particular tabulator arrangement partially illustrated in Figure 1 is fully described in the copending application No. 45,373, filed August 20, 1948, now Patent No. 2,580,318, in the name of H. L. Pitman, and with this arrangement, when a tabulator key 19 is depressed, mechanism, not shown, causes a shaft 21 to be rocked in a clockwise direction to thereby project the corresponding counterstop 20 under power. As shown in Figure 2, the shaft 21 is provided with an arm 22 which overlies a tab 23 provided upon one end of a pivotally mounted lever 24. The opposite end of the lever 24 is provided with a roller 25 which underlies the lower edge of a rack 26. The rack 26 is pivotally mounted upon the carriage 11 and its teeth normally mesh with the teeth of a pinion 27 of the escapement mechanism. When the shaft 21 is rocked clockwise, the lever 24 is rocked about its pivot 28 to thereby raise the rack 26 out of engagement with the pinion 27, thus freeing the carriage from the control of the escapement mechanism and permitting it to move freely in a letter-feed direction until the tabulator stop 18 of the oncoming column unit strikes the projected counterstop 20. As explained in the Pitman application No. 45,373, when the tabulator stop 18 strikes the counterstop, the shaft 21 is caused to rotate in a counterclockwise direction back to its normal position, to thereby allow the rack 26 to reengage the pinion 27 and return the carriage to the control of the escapement.

The typewriter keyboard has a row of numeral keys 29 as well as the usual letter keys 30. The numeral keys are carried upon key stems 31 each of which has a pendant 32 overlying one end of a link 33, the opposite end of which is provided with a toothed pawl 34. Each of the links 33 is pivotally connected at 35 to one arm of a pivotally mounted lever 36, another arm of which is connected by means of a rod 37 to a type bar 38. As explained in the Pitman Patent No. 2,398,395, referred to above, each of the type bars 38 cooperates with a universal bar 39 to operate the escapement mechanism every time a type bar is operated.

The machine chosen to illustrate the present invention is provided with a number of axially aligned registers or totalizers generally indicated in Figure 1 at 40. There is a group of indexable differential actuator bars 41 for each totalizer and each actuator 41 is provided on its forward end with a set of teeth constantly meshed with teeth of an idler gear 42 and is provided with a set of digit pins 43. The actuators 41 are normally so positioned that the pins 43 are out of vertical alignment with a series of bars 44 but they may be moved forward one at a time, in a manner to presently be more fully explained, into positions wherein said pins are aligned with the bars 44. The bars 44 are a part of the standard Underwood-Hanson indexing means and together with an upper set of bars 45 and bell cranks, not shown, constitute parallelogram linkages operable individually by rock shafts 46, only one of which is shown. Each rock shaft 46 is provided with an arm 47 underlying a pendant 48 pivoted at its upper end to one of the levers 36. Depression of a numeral key 29 causes the pendant 32 of the key stem 31 to rock the associated link 33 in a counterclockwise direction to thereby engage the toothed pawl 34 with a constantly rotating fluted shaft 49. The links 33 are also rocked at times by other means to be later described to move their toothed pawls into engagement with the shaft 49. When a pawl 34 engages the shaft 49, the link 33 is driven toward the rear of the machine to thereby rock the lever 36 and cause the type bar to strike against the platen 14, as will readily be understood. Thus, whenever a numeral type action is operated, either by manual depression of a numeral key or by other means, a lever 36 is rocked counterclockwise to thereby force its associated pendant 48 downwardly and cause a bar 44 corresponding in digital value to the type action to be lowered to set a corresponding pin 43 in whichever differential actuator has been moved forward.

As explained more fully in the patent to Pitman No. 2,090,852, there is a distributive rack 50 corresponding to each differential actuator 41 and each rack has pivotally connected to the forward end thereof a coupler 51 which is in longitudinal alignment with one of the differential actuators but which is normally lowered, as shown in Figure 1, so as not to cooperate with its differential actuator. Each distributive rack is articulated to one of a number of rockable cross-blades 52 to which is also articulated a master rack 53. As is well known, and as is explained in the patent to Pitman No. 2,090,852, there is a group of distributive racks for each totalizer and only one group of master racks, one rack for each denominational order. The rearmost end of each master rack 53 is in engagement with one arm of a bellcrank 54 the other arm of which is operatively connected to a push rod 55. Resting upon each push rod 55 is a denominational jack 56. The upper ends of the denominational jacks extend high enough to be struck and depressed by dogs provided for that purpose on the column units 17. As the jacks 56 are depressed one at a time as the carriage steps through a computing column, the distributive racks 50 will be moved forward one at a time, and due to the manner in which the master racks and distributive racks are articulated to the blades 52, the distributive racks will move forward beginning with the highest denominational order, even though the jacks are depressed in reverse order due to the right to left letter-feed movement of the carriage.

In order that different totalizers may be automatically selected by the carriage for operation in different computing columns, a series of register selecting cam plates 57 are provided. These cam plates 57 extend upwardly into the path of lugs provided upon the column units 17 so that, as the carriage moves into a computing zone, predetermined ones of said cam plates will be depressed. Each cam plate 57 rests upon a plate 58 which in turn rests upon a push rod 59, the lower end of which is pivotally connected to one end of a rockable lever 60. The opposite end of the lever 60 underlies an arm 61 operatively connected to one end of a rockshaft 62 to the opposite end of which is operatively connected a coupler lifter member 63. As fully explained in the copending application No. 49,345, filed September 15, 1948, now Patent No. 2,643,818, in the name of Aruthur H. Sharpe, when a cam plate 57 is depressed, a corresponding coupler lifter member 63 will be raised through the linkage just described, to thereby raise a set of couplers 51 into operative position with respect to one of the sets of differential actuator bars 41. As also explained in the said Sharpe application, when the coupler lifter member 63 is raised, a latch 64 is withdrawn from engagement with a state-control slide 65, thereby permitting said state-control slide to move forward to a position wherein the associated totalizer will be selected for performing an additive operation. There is also a cam plate, not shown but similar to the cam plates 57, which when depressed, causes a latch 66 to be withdrawn from engagement with the state-control slide to thereby permit said slide to move forward an additional distance and determine a subtractional operation for the totalizer. When a totalizer is thus selected for operation and the carriage steps through the computing zone depressing the denominational jacks 56 one at a time, the differential actuators will be moved forward one at a time beginning with the highest denominational order due to the fact that the couplers 51 are at that time aligned with said actuators.

After the lowest order digit of an amount has been typed, the carriage of course steps forward to the next letter space position. During this step of movement, a dog 67 on the column unit 17 which has just been active in that computing column passes over a cycle-trip member 68 thereby depressing said member. The cycle-trip member is operatively connected, as indicated in Figure 1, by the chain-dotted line 69, to a latch member 70 and when the cycle-trip member 68 is depressed, the latch member 70 is withdrawn from engagement with a stud 71 fixed to a disk 72, thereby permitting a spring 73 to rotate said disk slightly in a clockwise direction to cause the engagement of a one-revolution clutch, generally indicated at 74, which couples a constantly rotating power element 75 to a main cycle shaft 76, as fully explained in the patent to Pitman, No. 2,160,487. The cycle shaft then turns through one revolution until the stud 71 is again engaged by the latch member 70 to open the clutch 74.

Mechanism, not shown herein but well known and fully explained in the patent to Pitman, No. 2,091,717, operatively connects the cycle shaft 76 to the registers 40 in such manner that at the beginning of a cycle of the shaft 76, the selected register is moved down into engagement with rack teeth 77 provided upon the forward ends of the differential actuator bars 41 if the state-control slide 65 has moved forward to an addition determining position, or rearwardly into engagement with the teeth of the idler gears 42 if the state-control slide has moved forward to a subtraction determining position. As also explained in the said patent, No. 2,091,717, a general operator bar 78 is operatively connected to the cycle shaft 76 and is moved forward during a cycle from the position shown in Figure 1 to pick up any pins 43 which have been indexed in the differential actuator bars and thereby move said bars forwardly to run the indexed amount into the totalizer. Just before the general operator bar 78 begins its return movement, the totalizer is rocked back to its normal position shown in Figure 1.

After an amount has been accumulated in one of the totalizers, as a result of a series of adding and subtracting operations, it is desirable that said amount may be automatically read out of the totalizer and printed on the worksheet. There is a total key T, aligned with and similar to the tabulator keys 19, which when depressed causes a total tabulator reed 79 to be projected into the path of a total tabulator stop 80 provided upon any desired ones of the column units 17. Projection of the reed 79 frees the carriage from the control of the escapement mechanism in the same manner as does the projection of the hereinbefore referred to counterstops 20, and permits the carriage to move freely until the stop 80 strikes the projected end of said reed. There is a pin 81 provided upon the reed 79 and said pin is in engagement with one edge of a pivotally mounted lever 82 which carries a pin 83 in abutment with one end of a slidably mounted comb 84. The comb 84 is keyed to the register-selecting cam plates 57 and, when the reed 79 moves upward, the pin 81 rocks the lever 82 so that the pin 83 thereon pushes the comb 84 toward the rear to thereby rock the cam plates 57 from their forwardly slanting positions, shown in Figure 1, to a vertical position. In their vertical positions, the cam plates 57 do not cooperate with the hereinbefore referred to column unit dogs but rather cooperate with different column unit dogs, one of which is indicated at 85, so that when a total is to be printed only one register will be selected.

The comb 84 carries a headed interponent member 86, the enlarged head of which, when the comb is moved to its rearward position, becomes positioned between a pin 89 provided upon a jack 90 and a pin 91 provided upon a jack 92. The jack 90 extends into the path of a dog provided upon each of the column units 17 but this jack is not connected to any mechanism at its lower end and therefore when it is depressed, it causes no function to be performed. However, with the head of the interponent 86 between the pins 89 and 91, depression of the jack 90 causes the jack 92 to be depressed, and this jack rests with its lower end upon a push rod 93 and the lower end of the push rod is connected to one arm of a bell crank 94, similar to the bell cranks 54. As explained in the copending application No. 182,195, filed August 30, 1950, in the name of George K. Schulz, when the jack 92 is depressed to rock the bell crank 94, mechanism is operated to permit a set of digit-sensing fingers 95 to move forward into engagement with one of a spiral array of digit stops 96 associated with each of the register wheels.

There is a plate 97 associated with each finger 95, and when a set of digit-sensing fingers moves forward, a corresponding set of plates 97 drops down to position a cam-shaped lower edge of each plate in between a pair of the rack teeth 77 of each differential actuator bar 41 and a pin 98 provided upon an arm 99 pivotally connected to each of the fingers 95 becomes positioned over the top edge of each of said plates 97. There is a tab 100 provided upon each of the arms 99 and said tabs become positioned beneath one or another of a set of blades 101, depending upon the digital positions of the register wheels and the consequent degree of forward movement of said fingers. As the carriage steps through the total printing zone, the differential actuator bars 41 for the totalizer selected for operation, are moved forward one at a time, as previously explained, thereby camming the plates 97 upwardly one at a time to rock the arms 99 and cause the tabs 100 thereof to raise the blades 101.

As explained in the Pitman patent, No. 2,398,395, the blades 101 underlie a set of switches 102, each of which is wired in a circuit including a solenoid 103. When a blade 101 is raised to thereby operate one of the switches 102, the solenoid 103 corresponding in digital value to the totalizer wheel being sensed, is energized, whereupon its armature 104 is raised from the Figure 1 position to thereby raise the right-hand end of an associated link 33 and move the toothed pawl 34 thereof into engagement with the constantly rotating fluted shaft 49, to thereby cause the digit corresponding to the digital value of the sensed totalizer wheel to be printed.

In order that the objects of the present invention may be obtained, the denominational jacks 56 of the present machine are constructed in a somewhat different manner from the corresponding denominational jacks of the patents hereinbefore referred to. As shown in Figure 1, and as indicated diagrammatically in Figure 3, the upper ends of the denominational jacks for the tens of cents and the cents denomination are offset from longitudinal alignment with the upper ends of the jacks for the various denominations of dollars. For convenience, the upper ends of the denominational jacks for the dollars orders are indicated in Figure 3 at 56D and the upper ends of the denominational jacks for the tens of cents and units of cents are indicated at 56C. For those zones wherein an amount is to be printed in the ordinary manner, that is, with only a single letter space between the dollars portion and the cents portion, the column units are provided with a dog 105 which is wide enough to contact both the ends 56D and 56C of the denominational jacks. Such a dog 105 is shown for the right-hand column unit in Figure 3. In such columns wherein a wide dog 105 is provided, the machine operates in its usual well known manner.

For the wide column employed in typing an amount on a check upon which the words Dollars and Cents have previously been printed, two column units 17 are employed. The first column unit to be active in this amount-printing column is the one shown on the left in Figure 3, and this column unit carries a dog 85 to select the totalizer from which the amount is to be printed and a dog 106 so located as to cooperate with the upper ends 56D of the denominational jacks 56 and narrow enough so as not to contact the ends 56C. Thus, as the carriage steps through this amount-printing zone, the denominational jacks 56 controlling the printing of the dollars portion of the amount will be depressed by the left-hand column unit 17, shown in Figure 3. Without any further mechanism, the carriage would come to rest after the dog 106 stepped off of the units of dollars denominational jack 56. The dollars portion of the amount would, therefore, be printed and would be indexed in the differential actuator bars 41, but the machine would not be cycled to clear this portion of the amount from the totalizer, because as will be noted from Figure 3, this left-hand column unit does not have a dog 67 to operate the cycle-trip 68.

In order to space the carriage over the word Dollars before the printing of the cents portion of the amount, alternative mechanism has been provided which will either cause the carriage to letter space over the word Dollars or to be tabulated through that distance. The mechanism for letter spacing the carriage over the word Dollars is shown primarily in Figure 2, though a portion thereof is shown in Figure 1. There is a letter space controlling cam plate 107, the upper end of which is pointed as indicated in Figure 1 at 108, and the lower edge of which is connected to one end of a link 109. The other end of the link 109 is pivotally connected to a rockably mounted switch-operating member 110. The switch-operating member 110 cooperates with a switch 111 in such manner that when the cam plate 107 is depressed, the switch 111 will be closed.

The switch 111 is wired in a circuit including a normally closed microswitch 112 and a solenoid 113. The solenoid 113 is similar to, and is aligned with, the solenoids 103. The armature 114 of the solenoid 113 underlies one end of a link 115, similar to the links 33, and when the switch 111 is closed, to thereby energize the solenoid 113, a toothed pawl 116 of the link 115 is moved into engagement with the rotating fluted shaft 49. As seen in Figure 1, the link 115 is pivotally connected to a lever 117 to which lever is pivotally connected one end of a link 118, the opposite end of which is connected by means of a one-way connection 119 to an arm 120 fixed to a rockshaft 121. Also fixed to the rockshaft 121 is an arm 122 having a pin-and-slot connection 123 with one arm of a pivotally mounted crank 124. The other arm of the crank 124 is pivotally connected to an escapement dog rocker 125, an edge of which bears against one of the pivotally mounted dogs 126 and 127. Thus, when the cam plate 107 is depressed, the solenoid 113 moves the toothed pawl of the link 115 into engagement with the fluted shaft 49 thereby causing said link to be moved toward the right, as viewed in Figure 1, and through the linkage hereinabove described, causes an actuation of the escapement mechanism to allow the carriage to move forward one letter space.

As seen in Figure 2, an arm 128 underlies a portion of the mounting means for the escapement dogs 126 and 127 and said arm is fixed to a rockshaft 129 to which is also fixed an arm 130 connected to one end of a rod 131. The opposite end of the rod 131 is connected with an operating element 132 of the microswitch 112. When the dogs 126 and 127 are rocked, as above described, to permit a letter-feed movement of the carriage, the arm 128 is rocked in a clockwise direction to thereby cause the arm 130 to pull the link 131 towards the left to thereby open the microswitch 112, thus opening the circuit to the solenoid 113. When the dogs 126 and 127 return to their normal position the rod 131 causes the operating element 132 to again close the microswitch 112, thereby re-energizing the solenoid 113 which causes another letter-space movement of the carriage, in the same manner as previously described.

The cam plate 107 is articulated to the comb 84 and, like the register-selecting cam plates 57, is rocked rearwardly during total-taking operations. The left-hand column unit 17 shown in Figure 3, which is also the one shown in Figure 1, is provided with an elongated tappet 133 so positioned as to cooperate with the cam plate 107 when said cam plate is in its rearwardly rocked position. As the carriage steps from the position for printing the units of dollars amount on the check, the tappet 133 contacts the pointed end 108 of the cam plate 107 thereby depressing said cam plate and causing a series of letter step movements of the carriage. The tappet 133 is made of such length that the carriage will letter space over the printed word Dollars before a dog 134 on the middle column unit 17 comes to rest over the end 56C of the tens of cents denominational jack 56. It will be noted from Figure 3 that the dog 134 is laterally offset from the dog 106 so that said dog 134 will not contact the ends 56D of the denominational jacks 56 but is so positioned as to contact the ends 56C of the denominational jacks. Thus, the dog 134 is entirely ineffective until such time as it becomes positioned over the tens of cents denominational jack. The tens of cents and the units of cents digits are then printed in the manner previously described, and after the printing of the units of cents amount, a dog 67, provided upon the middle column unit, passes over the cycle trip member 68 to thereby cause a cycle of operation of the machine.

Instead of letter spacing the carriage across the word Dollars, the machine may be very simply set up to cause the carriage to tabulate across the word Dollars, and if such operation is desired a cam plate 135 may be provided, as shown in Figure 1. The cam plate 135 is pointed like the cam plate 107 and rests upon a plate 136 similar to the plates 58 and said plate 136 is pivotally connected to one end of a pivotally mounted lever 137, the opposite end of which is provided with a tab 138 underlying any desired tab key lever 139. If a suitable dog is provided upon the left-hand column unit 17 of Figure 3, said dog will depress the cam plate 135 after the units of dollars amount has been printed to thereby rock the lever 137 and cause the tab 138 thereof to raise the tabulator lever 139, thus causing a tabulator counterstop 29 to be raised as aforesaid into path of a tabulator stop 18 which would, in that case, be provided upon the middle column unit 17, thus permitting the carriage to tabulate across the word Dollars and bring the dog 134 of the middle column unit to rest on top of the tens of cents denominational jack 56.

If desired, provision may be made for automatically printing a suitable clear sign, such as a star, shown on the check specimen after the units of cents amount, to indicate that the register is clear. However, the present invention is not concerned with clear-sign printing and therefore such mechanism need not be described.

Having thus described the invention what is claimed is:

An accounting machine for automatically printing monetary amounts one digit at a time in such fashion that the highest order fractional currency unit is spaced a substantial distance to the right of the lowest order currency unit comprising, a typewriting section and a computing section, said typewriting section having the usual numeral type actions, escapement mechanism and letter-feed carriage, said computing section having a totalizer comprising a plurality of axially aligned denominational order wheels rotatable independently to digit representing angular positions, total read-out means for sensing the digit representing angular positions of said wheels and translating said sensing into actuation of the numeral type actions, said total read-out means being operable denomination by denomination, a first control element carried by said letter-feed carriage, said control element having a short cam and a long cam thereon, a first set of devices extending into the path of movement of said short cam whereby said devices will be moved one at a time by said cam as the carriage steps along, said devices being operatively connected to means for operating those denominations of said read-out means representing the currency units, a second control element carried by said letter-feed carriage and having a cam thereon, a second set of devices extending into the path of movement of the cam on said second control element, said second set of devices being operatively connected to means for operating those denominations of the read-out means representing the fractional currency units, the two sets of devices being out of lateral alignment with one another so that the first set of devices will not be hit by the cam of the second control element and the second set of devices will not be hit by either of the two cams of the first control element, escapement operating mechanism, a depressible member for instituting operation of said escapement operating mechanism, said depressible member being located in the path of movement of the long cam on said first control element, said long cam being so constructed and arranged as to contact and depress said depressible member as the carriage steps from the position for printing the lowest order currency unit and to hold said member depressed until the carriage has taken a plurality of steps, at which time the cam on the second control element will move into contact with the highest order one of the second set of devices.

References Cited in the file of this patent
UNITED STATES PATENTS

| 1,278,062 | Vickers | Sept. 3, 1918 |
| 1,997,073 | Muller | Apr. 9, 1935 |
| 2,160,487 | Pitman | May 30, 1939 |
| 2,192,365 | Pitman | Mar. 5, 1940 |
| 2,202,671 | Pitman | May 28, 1940 |
| 2,372,681 | Pitman | Apr. 3, 1945 |